United States Patent
Glazner et al.

(10) Patent No.: US 10,237,614 B2
(45) Date of Patent: Mar. 19, 2019

(54) CONTENT VIEWING VERIFICATION SYSTEM

(71) Applicant: Cisco Technology, Inc., San Jose, CA (US)

(72) Inventors: Yoav Glazner, Beit Shemesh (IL); Amitay Stern, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 15/490,916

(22) Filed: Apr. 19, 2017

(65) Prior Publication Data

US 2018/0310059 A1    Oct. 25, 2018

(51) Int. Cl.
| | |
|---|---|
| *H04N 21/442* | (2011.01) |
| *G06F 17/30* | (2006.01) |
| *G06K 9/64* | (2006.01) |
| *H04N 21/84* | (2011.01) |
| *G06K 9/00* | (2006.01) |
| *G06T 15/00* | (2011.01) |

(52) U.S. Cl.
CPC . *H04N 21/44218* (2013.01); *G06F 17/30784* (2013.01); *G06K 9/00744* (2013.01); *G06K 9/64* (2013.01); *H04N 21/84* (2013.01); *G06T 15/00* (2013.01)

(58) Field of Classification Search
CPC ............. H04N 21/44218; H04N 21/84; G06K 9/00744; G06K 9/64; G06F 17/30784; G06T 15/00
See application file for complete search history.

(56) References Cited

U.S. PATENT DOCUMENTS

| | | | |
|---|---|---|---|
| 6,701,030 B1* | 3/2004 | Uyttendaele | G06K 9/03 348/36 |
| 8,606,634 B2 | 12/2013 | Porter et al. | |
| 9,026,458 B2 | 5/2015 | Blatchley et al. | |
| 9,363,569 B1 | 6/2016 | Van Hoff et al. | |
| 9,424,461 B1* | 8/2016 | Yuan | G06K 9/00201 |
| 9,882,886 B1* | 1/2018 | Kowshik | H04L 63/08 |
| 2007/0122058 A1* | 5/2007 | Kitaura | G06T 7/579 382/284 |
| 2011/0264536 A1 | 10/2011 | Chodroff et al. | |
| 2012/0008830 A1* | 1/2012 | Yoshii | G06T 7/0044 382/103 |

(Continued)

OTHER PUBLICATIONS

Pratt, Marcus: "Combating Impression Fraud Isn't Easy, Here's What To Do Today", Ad Exchanger, Jan. 31, 2014; available on the web at https://adexchanger.com/data-driven-thinking/combating-impression-fraud-isnt-easy-heres-what-to-do-today/.

(Continued)

*Primary Examiner* — Ming Y Hon
(74) *Attorney, Agent, or Firm* — Merchant & Gould P.C.

(57) ABSTRACT

In one embodiment, a method comprising receiving data of a plurality of viewports generated from a content item during rendering of the content item, receiving data about at least one feature included in the content item, comparing the data of the plurality of viewports with the data about the at least one feature included in the content item, and computing a score representing to what extent the at least one feature is included in the plurality of viewports. Related apparatus and methods are also described.

20 Claims, 6 Drawing Sheets

(56) References Cited

U.S. PATENT DOCUMENTS

| | | | |
|---|---|---|---|
| 2012/0294477 A1* | 11/2012 | Yang | G06K 9/4671 |
| | | | 382/103 |
| 2014/0282618 A1 | 9/2014 | Carncross et al. | |
| 2014/0355823 A1* | 12/2014 | Kwon | G06K 9/00711 |
| | | | 382/103 |
| 2014/0375685 A1* | 12/2014 | Koga | G06Q 10/0631 |
| | | | 345/633 |
| 2015/0339539 A1* | 11/2015 | Gu | G06K 9/00335 |
| | | | 382/190 |
| 2015/0379086 A1* | 12/2015 | Sheridan | G06F 17/30522 |
| | | | 707/748 |
| 2016/0301862 A1 | 10/2016 | Rantakokko et al. | |
| 2018/0192094 A1* | 7/2018 | Barnett | G06K 9/52 |

OTHER PUBLICATIONS

Crawford, Todd; "Online Ad Fraud and How to Mitigate It"; from Impact Radius; Nov. 4, 2014; available on the web at: https://impactradius.com/blog/digital-advertising-online-ad-fraud/.
NBA VR: Jan. 1, 2017; available on the web at: http:www.nba.com/vr.

* cited by examiner

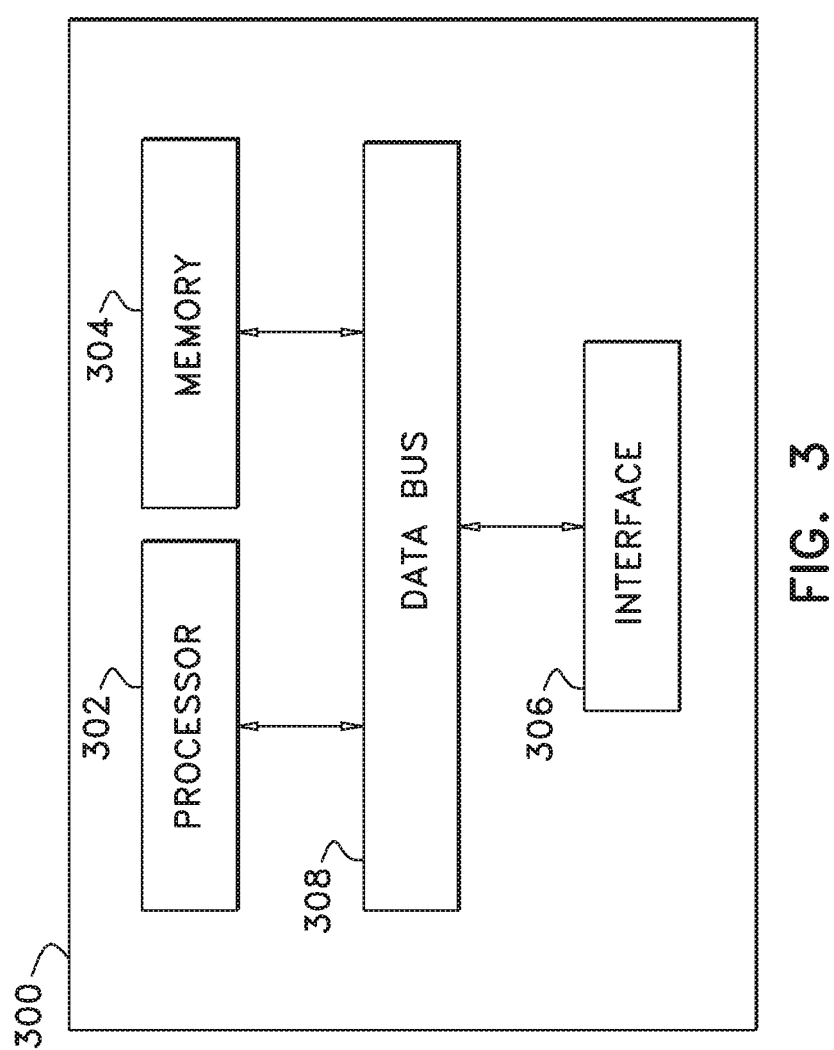

CONTENT VIEWING VERIFICATION SYSTEM

TECHNICAL FIELD

The present disclosure generally relates to verification of whether content is being viewed by a human or by a machine or software robot.

BACKGROUND

Virtual reality and immersive broadcasts are already taking place and it is reasonable to assume that VR and immersive adverts will also appear in the near future. Advertisers and publishers alike will expect great value from such adverts, which makes ad-fraud a big threat. Ad fraud is performed when fictitious views are made in order to artificially increase the impressions ("views") and thus the ad publisher receives unjustified revenue.

BRIEF DESCRIPTION OF THE DRAWINGS

The present disclosure will be understood and appreciated more fully from the following detailed description, taken in conjunction with the drawings in which:

FIG. 3 is a block diagram view of a device in the system of FIG. 1;

DESCRIPTION OF EXAMPLE EMBODIMENTS

Overview

There is provided in accordance with an embodiment of the present disclosure, a method including receiving data of a plurality of viewports generated from a content item during rendering of the content item, receiving data about at least one feature included in the content item, comparing the data of the plurality of viewports with the data about the at least one feature included in the content item, and computing a score representing to what extent the at least one feature is included in the plurality of viewports.

DETAILED DESCRIPTION

Figure 1:
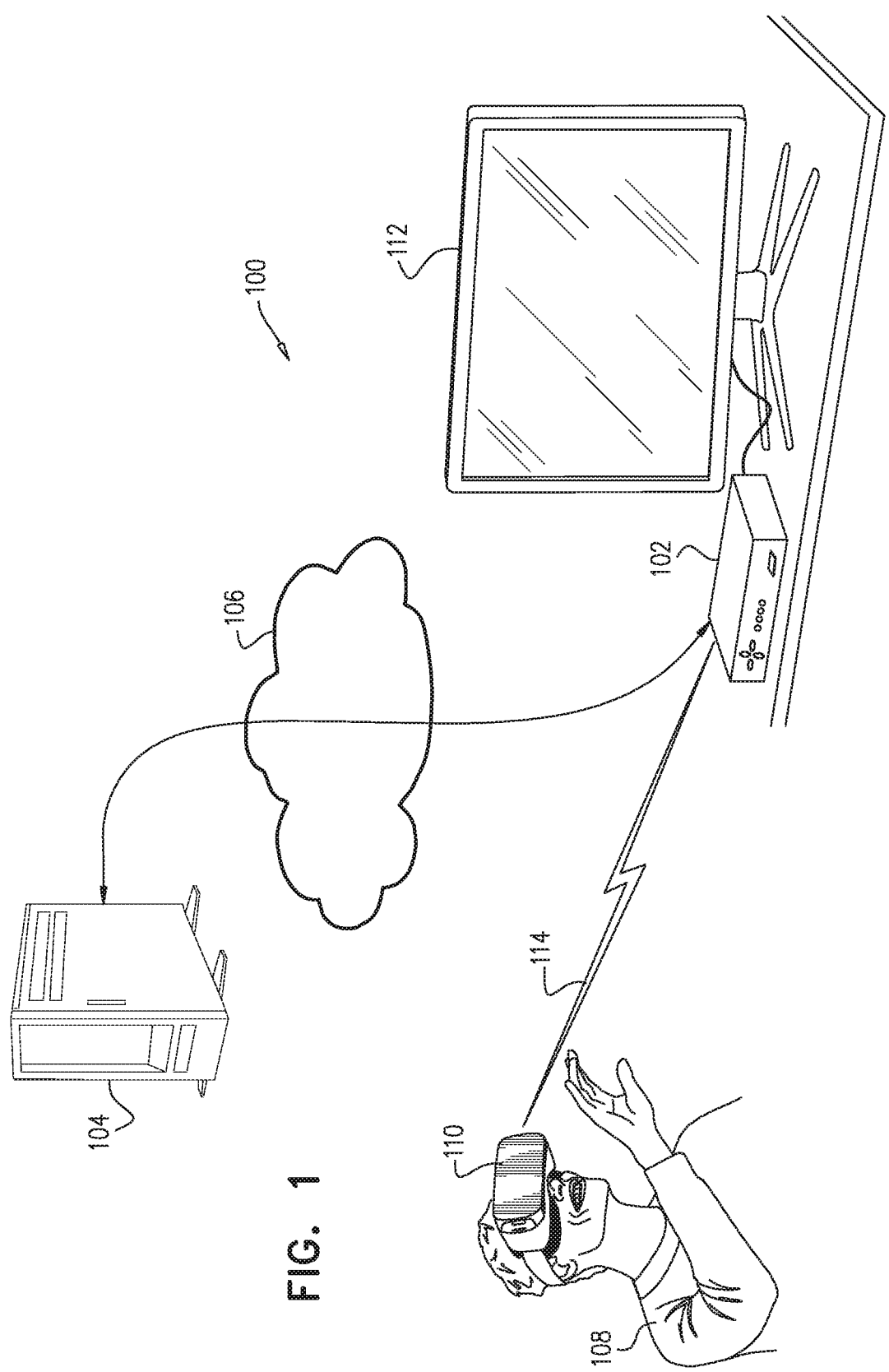
FIG. 1 is a partly pictorial, partly block diagram view of a content viewing verification system constructed and operative in accordance with an embodiment of the present disclosure.
Figure 2A:
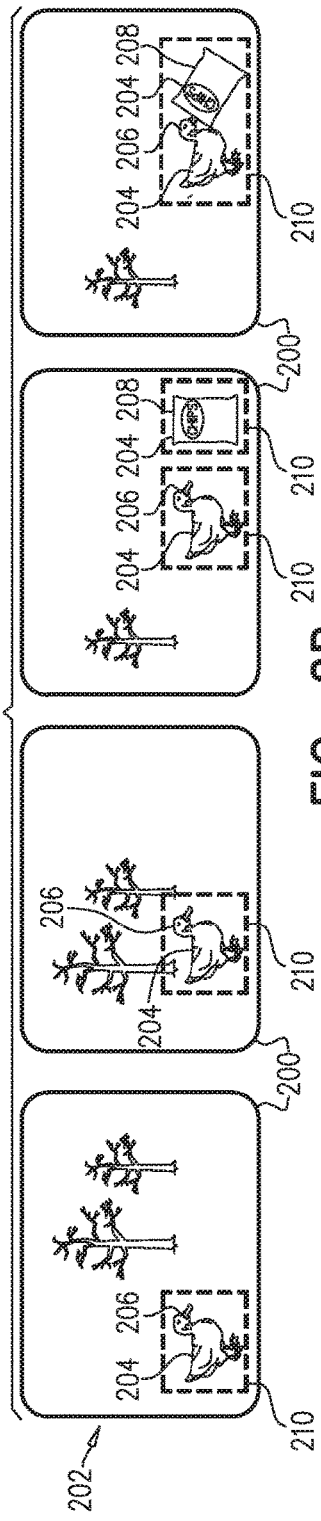
FIG. 2A is a view of a plurality of images from an exemplary content item highlighting at least one feature in each of the images for use in the system of FIG. 1.
Figure 2B:
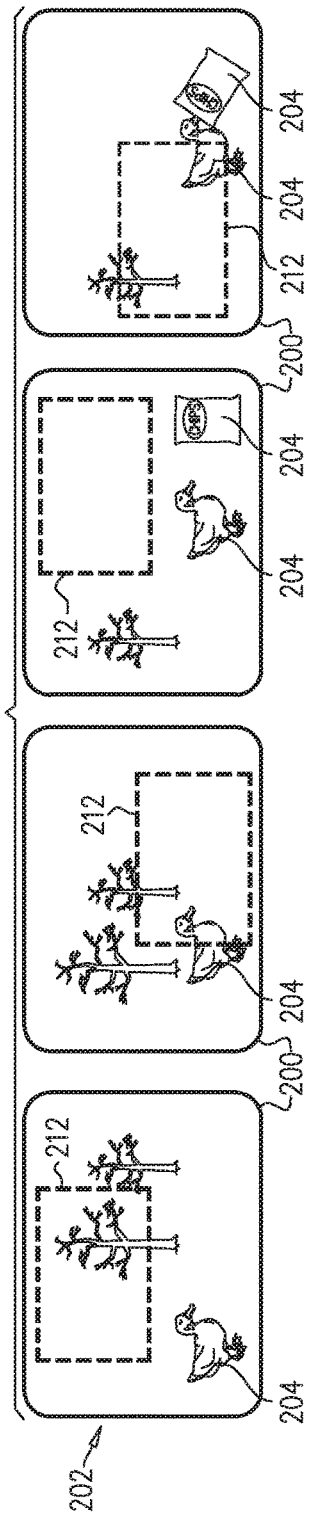
FIG. 2B is a view of the plurality of images of FIG. 2A showing how parts of each image was viewed by an automated viewer.
Figure 2C:
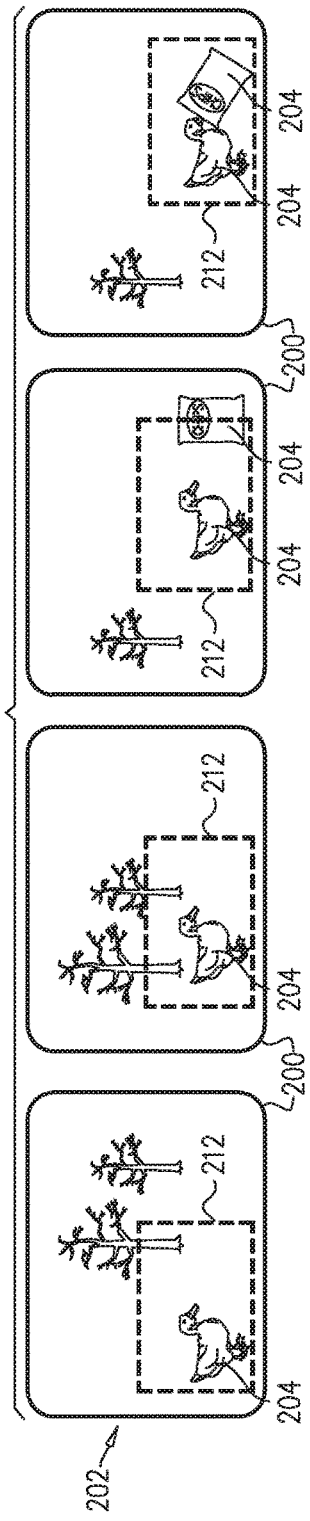
FIG. 2C is a view of the plurality of images of FIG. 2A showing how parts of each image was viewed by a human viewer.

Reference is now made to FIG. 1, which is a partly pictorial, partly block diagram view of a content viewing verification system 100 constructed and operative in accordance with an embodiment of the present disclosure. It should be noted that the reference numerals listed in FIG. 1 are in the 100-199 range, and the reference numerals in FIGS. 2A-C are in the 200-299 range and so on with all the figures. Therefore, when reference numerals are being discussed, the reader will immediately know which figure(s) the reference numeral appears in. The content viewing verification system 100 includes a content rendering device 102 such as a set-top box, or home computer, or tablet device, or mobile device, or other suitable content rendering device. The content viewing verification system 100 receives content from a content server 104 such as a broadcast Headend or a pay-per-view server or any suitable content server. The content is received via a content delivery medium 106, for example, but not limited to, an Internet Protocol network, a satellite or cable network, a mobile phone network, or any suitable delivery medium or any suitable combination of content delivery mediums. The content rendered by the content rendering device 102 may be any suitable content, for example, but not limited to, 360-degree or panoramic video content and/or virtual reality content. 360-degree videos, also known as immersive videos or spherical videos, are generally video recordings where a view in every direction is recorded at the same time, shot using an omnidirectional camera or a collection of cameras. During playback the viewer has control of the viewing direction like a panorama. Virtual reality (VR) typically refers to computer technologies that use software to generate realistic images, sounds and other sensations that replicate a real environment or create an imaginary setting, and simulate a user's physical presence in this environment. VR content may be rendered with or without a script depending on various factors including the purpose of the creators of the content.

A viewer 108 may view the content using a virtual reality headset 110 (also known as a head-mounted display (HMD)) or on a display device 112, for example, but not limited to, a computer monitor, a television screen, a touch-sensitive screen, or LCD screen. The virtual reality headset 110 may be connected to the content rendering device 102 via a wired connection and/or via a wireless connection 114, for example, using Bluetooth or other wireless technology. The display device 112 may or may not be integrated with the content rendering device 102. The viewer 108 may be able to look around an artificial world and possibly interact with features or items in that world or look around at different views within a 360-degree video depending on the content type. At any one time, the viewer 108 generally views only part of the content available for viewing at that time, for example, the viewer 108 may view a viewport of a video frame(s) or of a computer generated scene. It will be appreciated that the content may include any suitable content item, for example, but not limited to, movies, television programs and/or advertisements.

By way of introduction, when a human watches a content item, the human most likely moves his/her head to the more interesting parts of a current scene in the content item, while a machine or software robot ("bot") typically does not move at all or makes random movements. Therefore, the content viewing verification system 100 attempts to distinguish viewing by a human from viewing by a bot based on which parts of the content item were viewed during rendering of the content item. The content rendering device 102 records data about the viewports generated during rendering of the content item, i.e., which parts of the content item were viewed during rendering of the content item. The data about the viewports is then analyzed (either in the content rendering device 102 or in a remote processing device) to determine to what extent the data about the viewports indicates that the viewports include predefined features (e.g., interesting features) of the content item. The extent to which the viewports include the predefined features provides an indication of whether the content item was viewed by a human or a bot. In addition to identifying whether content has been viewed by a human or a bot, the content viewing verification system 100 may be used to rate more or less effective content items including advertisements, by way of example only, as it may be assumed that more engaged viewers follow the more interesting features of the content.

Only one content rendering device 102 has been shown in FIG. 1. It will be appreciated that the content viewing verification system 100 may include many content rendering devices 102 disposed in different location and possibly more than one rendering device 102 even in the same household, by way of example only.

Reference is now made to FIG. 2A, which is a view of a plurality of images 200 from an exemplary content item 202 highlighting at least one feature 204 in each of the images 200 for use in the system 100 of FIG. 1. Each of the images 200 may be a frame or frames in a 360-degree video or a scene from VR content. The series of images 200 depict a duck 206 walking to a bag of chips 208 and then trying to eat the bag of chips 208. The interesting features in the images 200 are the duck 206 and the bag of chips 208. The interesting features may be defined by their coordinates in the images 200. For the sake of illustration, the coordinates have been depicted by way of boxes 210 with a dotted line in FIG. 2A. For example, the boxes 210 may be defined by the coordinates of a corner each box 210 as well as a height and width of each box 210 within one of the images 200.

Reference is now made to FIG. 2B, which is a view of the plurality of images 200 of FIG. 2A showing how parts of each image 200 were viewed by an automated viewer or bot. A plurality of viewports 212 generated during rendering of the content item 202 show that the bot is randomly "viewing" parts of the content item 202 and the features 204 may or may not be included in the viewports 212. In the example of FIG. 2B even when the features 204 are included in the viewports 212, the features 204 are included by chance rather than based on a "conscious decision" of the bot.

When the content item 202 is a virtual reality content item, a viewport is typically a two-dimensional (2D) rectangle onto which a three-dimensional (3D) scene is projected. When the content item is a 360-degree video, a viewport is typically a region of the screen used to display a portion of the total image or frame(s).

Reference is now made to FIG. 2C, which is a view of the plurality of images 200 of FIG. 2A showing how parts of each image 200 were viewed by a human viewer. The viewports 212 generated during rendering of the content item 202 show that the human viewer (e.g., viewer 108) is generally following the features 204 as the features are either wholly or partially included in the viewports 212. It will be appreciated that prior to this point the viewer 108 may have scanned the images 200 before finding the feature(s) 204. It will be appreciated that the degree of engagement of the viewer 108 in the content item 202 generally influences to what extent the features 204 will be included in the viewports 212. By evaluating to what extent the features 204 are included in the viewports 212, the content viewing verification system 100 may make an assumption as to whether the content item 202 was viewed by a human or a bot and/or provide some sort of engagement rating.

Reference is again made to FIG. 2A. The interesting features 204 may be defined manually by a human operator identifying the interesting features 204 in each of the images 200. It will be appreciated that not all of the images 200 or frames in a video or VR content need to be analyzed for interesting features 204. Instead, a sampling of the images 200 may be performed and the data about the interesting features 204 from the sampled images 200 may then be compared to corresponding viewports 212 (FIGS. 2B, 2C) so that not all viewports 212 (FIGS. 2B, 2C) need to be analyzed by the content viewing verification system 100 to determine to what extent the features 204 are included in the viewports 212 (FIGS. 2B, 2C).

Alternatively, the interesting features 204 may be defined based on data analytics, for example, based on average viewport position per image 200 which may be collected from viewport data of a group of viewers who have viewed the same content item 202. It will be appreciated that security measures may be necessary to prevent a bot from using data about the features 204 to perform fraudulent viewing in accordance with the features.

The data about the feature(s) 204 may be sent to the content rendering device 102 with the content item 202 when the content viewing verification system 100 analyzes the viewports 212 (FIGS. 2B, 2C) against the feature(s) 204 in the content rendering device 102. Alternatively, the content viewing verification system 100 may analyze the viewports 212 (FIGS. 2B, 2C) against the feature(s) 204 in a remote processing device, for example, but not limited to, the content server 104 or any other suitable remote server or cloud processing device or arrangement.

Each feature 204 may be defined using any appropriate data, for example, by a time stamp or frame(s)/image reference number of the frame(s)/image in which the feature 204 is included as well as position coordinates of the feature 204 within the frame(s) or image. For example, in the content item 202 the duck 206 is running at time=0:10, x position=100, y position=200; the duck 206 spots the bag of chips 208 at time=0:13, x position=400, y position=200; and the duck 206 eats from the bag of chips 208 at time 0:20, x position=600, y position=50. In the above example, the content viewing verification system 100 compares the data about the features 204 at times 0:10, 0:13 and 0:20 with corresponding viewports 212 (FIGS. 2B, 2C) at times 0:10, 0:13 and 0:20 and then the viewing is scored accordingly.

Scoring may be based on whether or not the features 204 are in the corresponding viewports 212 (FIGS. 2B, 2C) or not, so that even if one of the features 204 is only partially within a corresponding viewport 212 (FIGS. 2B, 2C), the score allotted based on analysis of that viewport 212 is given the highest score and if the feature 204 is not in the viewport 212 (FIGS. 2B, 2C), the score allotted based on analysis of that viewport 212 (FIGS. 2B, 2C) is given a zero. Alternatively, the score allotted based on analysis of the viewport 212 (FIGS. 2B, 2C) may be rated according to how much of the feature 204 is included in the corresponding viewport 212 (FIGS. 2B, 2C). For example, if the center of the feature 204 is in the center of the viewport 212 (FIGS. 2B, 2C) then the highest score is allotted, but if the feature 204 is on the edge of the viewport 212 (FIGS. 2B, 2C) then the lowest or lower score is allotted. There could then be a linear or non-linear scaling of scoring based on positions from the center to the edge. Alternatively, the score may be proportional to the volume of the feature 204 included in the viewport 212 (FIGS. 2B, 2C).

In some embodiments the features 204 may be defined as images. For example, in the example of the content item 202, the features 204 may be defined as various images of the duck 206 and the bag of chips 208. Recorded images of the viewports 212 (FIGS. 2B, 2C) are then searched for the images of the duck 206 and bag of chips 208 and then the viewing is scored accordingly.

Reference is now made to FIG. 3, which is a block diagram view of a device 300 for use in the system 100 of FIG. 1. The device 300 includes a processor 302, a memory 304, an interface 306 and a data bus 308. The memory 304 is operative to store data used by the processor 302. The device 300 is operative to analyze the feature(s) 204 against data about corresponding viewports 212 and determine a score about what extent the features 204 are included in the viewports 212. The data bus 308 is operative to connect the elements of the device 300 for data The device 300 may be implemented by the content rendering device 102 or by the content server 104 or by any other suitable processing device.

Figure 4:
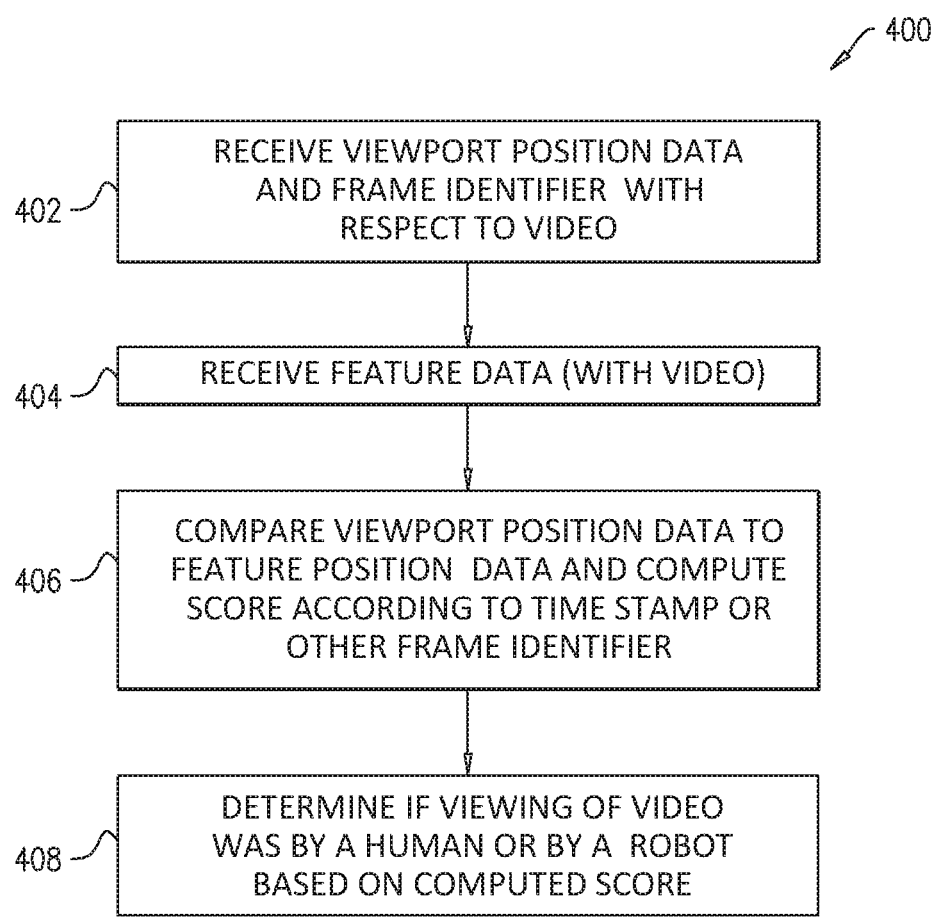
FIG. 4 is a flow chart showing exemplary steps in a method of operation of the system of FIG. 1.

Reference is now made to FIG. 4, which is a flow chart showing exemplary steps in a method 400 of operation of the system 100 of FIG. 1. The processor 302 is operative to receive data of the viewports 212 generated from the content item 202 during rendering of the content item 202 (block 402). In the method 400, the content item 202 is a video, for example, but not limited to, a 360-degree video. The data may be received by retrieval of the data from the memory 304. The data may be received via the interface 306 from the content rendering device 102 when the device 300 is implemented externally to the content rendering device 102. Each viewport 212 is generated from a different video frame(s) of the video during rendering of the video. Each viewport 212 provides only a partial image from a total image of the video frame or frames that the viewport 212 was generated from. The data of the viewports 212 includes position data and frame identifiers of the viewports 212 with respect to the video. The data of the viewports 212 may be comprised in a plurality of viewport data sets. Each viewport data set includes data about a different viewport 112. Each viewport data set for a certain viewport may include: (a) position data of that viewport 112; and (b) an identifier(s) (e.g., frame number(s) or timestamp) of the video frame(s) from which that viewport 112 was generated.

The processor 302 is operative to receive data about one or more features 204 included in the content item 202 (block 404). The data may be received by retrieval of the data from the memory 304 and/or received via the interface 306 from the content server 104. If the device 300 is implemented in the content rendering device 102, the interface 306 may be operative to receive the content item 202 with metadata including the data about the feature(s) 204 included in the content item 102 from the content server 104. The data about the feature(s) 204 included in the video may be comprised in a plurality of feature data sets. Each feature data set includes data about a different video frame(s) of the video. Each feature data set includes: (a) position data of that feature 204 in the video frame including that feature 204; and (b) an identifier(s) (e.g., frame number(s) or timestamp) of the video frame(s) (including that feature) in the video.

The processor 302 is operative to compare the position data of the viewports 212 with the position data about the feature(s) 204 included in the content item 202 to determine to what extent the feature(s) 204 are included in the content item 202. In some embodiments the processor 302 is operative to compare corresponding ones (corresponding based on frame identifier or timestamp) of the feature data sets with the viewport data sets. The processor 302 is operative to compute a score representing to what extent the at least one feature is included in the plurality of viewports (block 406). The processor 302 is operative to determine if viewing of the video was by a human or a robot based on the computed score (block 408). The content viewing verification system 100 may set a limit as to which score signifies a human viewer and which score signifies a bot. The limit may be set by a human operator and/or based on an average score determined by the content viewing verification system 100. If the computation of the score is performed in the content rendering devices 102, the limit may be sent to each content rendering device 102 by the content server 104.

Figure 5:
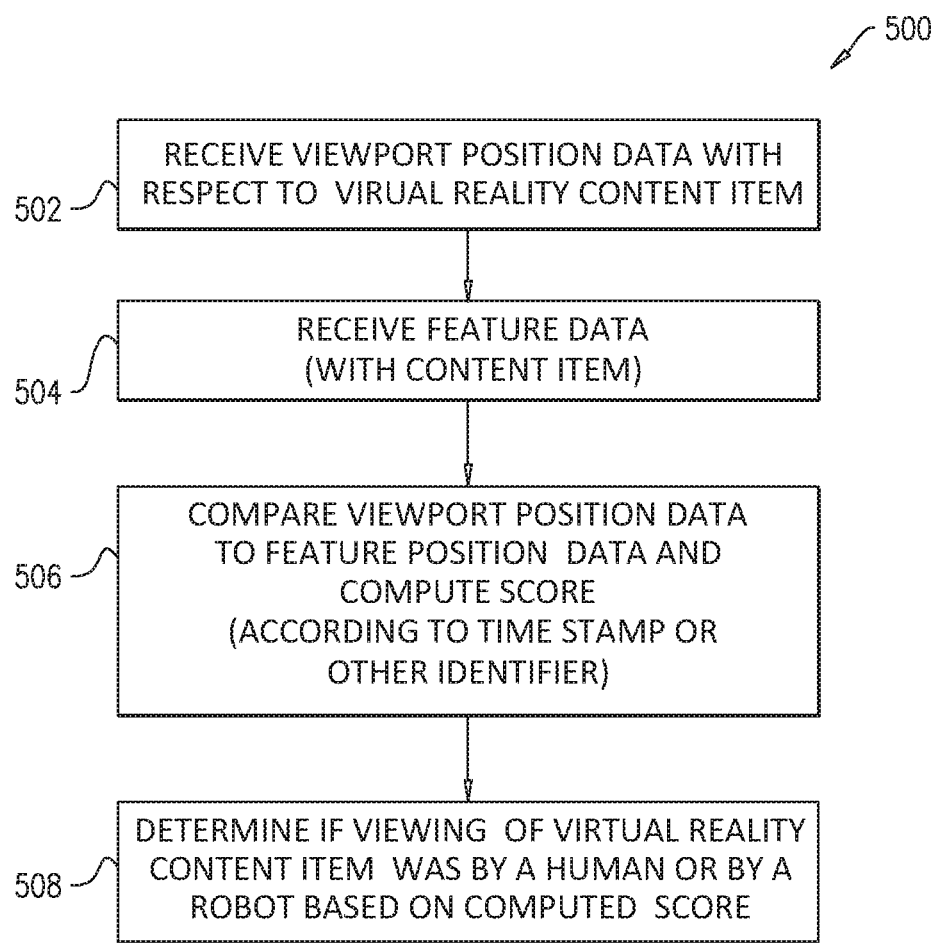
FIG. 5 is a flow chart showing exemplary steps in a first alternative method of operation of the content viewing verification system of FIG. 1.

Reference is now made to FIG. 5, which is a flow chart showing exemplary steps in a first alternative method 500 of operation of the system 100 of FIG. 1. The processor 302 is operative to receive data of the viewports 212 generated from the content item 202 during rendering of the content item 202 (block 502). In the method 500, the content item 202 is rendered as virtual reality, 3D rendered content, based on at least one 3D model, or 3D area or box. The data may be received by retrieval of the data from the memory 304. The data may be received via the interface 306 from the content rendering device 102 when the device 300 is implemented externally to the content rendering device 102. The data of the viewports 212 includes position data of the viewports 212 with respect to the content item 202, for example, from where in the 3D model, area or box each viewport 212 is generated, and/or position and orientation of a virtual camera used to generate each viewport 212, and optionally a temporal references for each viewport 212 indicating when that viewport 212 was generated in the rendering process of the 3D rendered content. The processor 302 is operative to receive data about the feature(s) 204 included in the content item 202. The interface 306 may be operative to receive the content item 202 with metadata including the data about the feature(s) 204 included in the content item 202 (block 504). The processor 302 is operative to compare the position data of the viewports 212 against the position data about the feature(s) 204 included in the content item 202 to determine to what extent the feature(s) 204 are included in the content item 202. The comparison is typically performed according to a time stamp or other identifier included in the data of the viewports 212 and the feature(s) 204. The processor 302 is operative to compute a score representing to what extent the feature(s) 204 is included in the viewports 212 (block 506). The processor 302 is operative to determine if viewing of the content item 202 was by a human or a robot based on the computed score (block 508).

Figure 6:
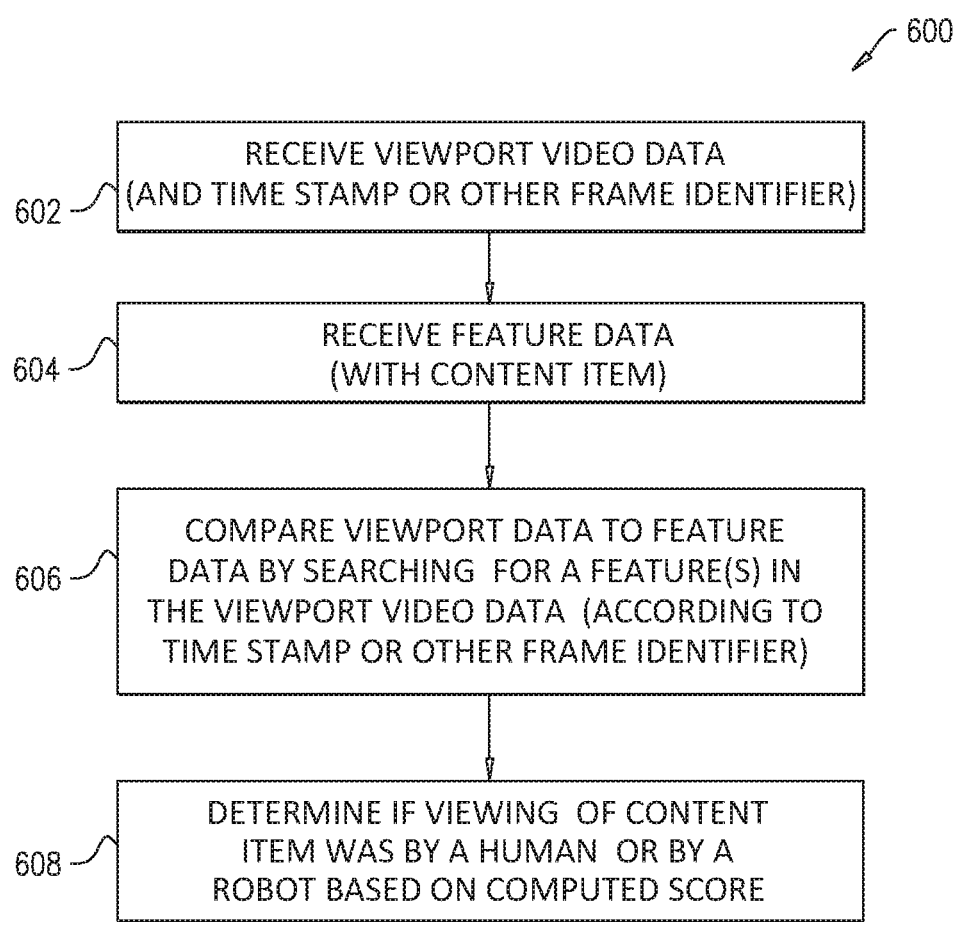
FIG. 6 is a flow chart showing exemplary steps in a second alternative method of operation of the content viewing verification system of FIG. 1.

Reference is now made to FIG. 6, which is a flow chart showing exemplary steps in a second alternative method 600 of operation of the system 100 of FIG. 1. In the method 600, the data of the viewports 212 is video data including an image of each viewport 212 recorded during the rendering of the content item 202. It should be noted that not all the viewports 212 may be recorded so that the viewport data may be not be a continuous video and may even be separate images of certain viewports 212. The content item 202 may be rendered as virtual reality, 3D rendered content, based on at least one 3D model (area or box), or as a video, for example, but not limited to, a 360-degree video. The processor 302 is operative to receive the video/image data of the viewports 212 generated from the content item 202 during rendering of the content item 202. When the content item 202 is a video, each viewport 212 is generated from a different frame or frames of the video during rendering of the video and each viewport 212 provides only a partial image from a total image of the video frame(s) from which that viewport 212 was generated.

The processor 302 is operative to receive data about the feature(s) 204 included in the content item 202. The data of each feature 204 is received as an image of that feature 204, e.g., an image of the duck 206 and/or the bag a chips 208. The interface 306 is optionally operative to receive the content item 202 with metadata including the data about the feature(s) 204 included in the content item 202 (block 604).

The processor 302 is operative to compare the data of the viewports with the data about the feature(s) 204 included in the content item 202. This comparison step includes searching for the feature(s) 204 in the video data of the viewports optionally according to a time stamp or other frame or image identifier(s) (block 606). When searching is performed according to the time stamp or frame/image identifier(s), the processor 302 may limit which feature(s) 204 are searched for in which viewport's video data. Based on the comparing, the processor 302 is operative to compute a score representing to what extent the feature(s) 204 is included in the viewports 212. The processor 302 is operative to determine if viewing of the content item 202 was by a human or a robot based on the computed score (block 608).

In practice, some or all of the functions of the processor 302 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
   receiving, by a processor, data of a plurality of viewports generated from a content item during rendering of the content item;
   receiving data about at least one feature included in the content item;
   comparing the data of the plurality of viewports with the data about the at least one feature included in the content item;
   determining, in response to comparing the data of the plurality of viewports with the data about the at least one feature included in the content item, a score representing to what extent the at least one feature is included in the plurality of viewports; and
   determining that a human viewed the content item based on the score when the score indicates a value above a previously determined average score representing to what extent the at least one feature is included in the plurality of viewports for a plurality of previous renderings of the content item.

2. The method according to claim 1, wherein: the data of the plurality of viewports is position data of the plurality of viewports; and the comparing includes comparing the position data of the plurality of viewports with respect to the content item against position data of the at least one feature included in the content item.

3. The method according to claim 1, wherein: the data of the plurality of viewports is video data of the plurality of viewports; and the comparing includes searching for the at least one feature in the video data of the plurality of viewports.

4. The method according to claim 1, wherein: the content item is a video; and each one viewport of the plurality of viewports is generated from a different at least one video frame of a plurality of video frames of the video during rendering of the video, wherein the one viewport provides only a partial image from a total image of the at least one video frame.

5. The method according to claim 4, wherein the video is a 360 degree video.

6. The method according to claim 4, wherein:
   the data of the plurality of viewports is comprised in a plurality of viewport data sets, each one viewport data set of the plurality of viewport data sets including data about a different one viewport of the plurality of viewports, each one viewport data set including: (a) first position data of the one viewport; and (b) a first identifier of the at least one video frame from which the one viewport was generated; and
   the data about at least one feature included in the video is comprised in a plurality of feature data sets, each one feature data set of the plurality of feature data sets including data about a different at least one second video frame of the plurality of video frames, each one feature data set including: (a) second position data of a feature in the at least one second video frame; and (b) a second identifier of the at least one second video frame in the video; and
   the comparing includes comparing at least two of the plurality of feature data sets with at least two of the plurality of viewport data sets.

7. The method according to claim 1, wherein the content item is rendered as 3D rendered content.

8. The method according to claim 1, further comprising receiving the content item with metadata which includes the data about the at least one feature included in the content item.

9. A system comprising a processor and a memory to store data used by the processor, wherein the processor is operative to:
   receive data of a plurality of viewports generated from a content item during rendering of the content item;
   receive data about at least one feature included in the content item;

compare the data of the plurality of viewports with the data about the at least one feature included in the content item; and determine, in response to comparing the data of the plurality of viewports with the data about the at least one feature included in the content item, a score representing to what extent the at least one feature is included in the plurality of viewports; and determine that a human viewed the content item based on the score when the score indicates a value above a previously determined average score representing to what extent the at least one feature is included in the plurality of viewports for a plurality of previous renderings of the content item.

10. The system according to claim 9, wherein: the data of the plurality of viewports is position data of the plurality of viewports; and the processor is operative to compare the position data of the plurality of viewports with respect to the content item against position data of the at least one feature included in the content item.

11. The system according to claim 9, wherein: the data of the plurality of viewports is video data of the plurality of viewports; and the processor is further operative to search for the at least one feature in the video data of the plurality of viewports.

12. The system according to claim 9, wherein: the content item is a video; and each one viewport of the plurality of viewports is generated from a different at least one video frame of a plurality of video frames of the video during rendering of the video, wherein the one viewport provides only a partial image from a total image of the at least one video frame.

13. The system according to claim 12, wherein the video is a 360 degree video.

14. The system according to claim 12, wherein:

the data of the plurality of viewports is comprised in a plurality of viewport data sets, each one viewport data set of the plurality of viewport data sets including data about a different one viewport of the plurality of viewports, each one viewport data set including: (a) first position data of the one viewport; and (b) a first identifier of the at least one video frame from which the one viewport was generated; and the data about at least one feature included in the video is comprised in a plurality of feature data sets, each one feature data set of the plurality of feature data sets including data about a different at least one second video frame of the plurality of video frames, each one feature data set including: (a) second position data of a feature in the at least one second video frame; and (b) a second identifier of the at least one second video frame in the video; and the processor is operative to comparing at least two of the plurality of feature data sets with at least two of the plurality of viewport data sets.

15. The system according to claim 9, wherein the content item is rendered as 3D rendered content.

16. The system according to claim 9, further comprising an interface to receive the content item with metadata including the data about the at least one feature included in the content item.

17. A software product, comprising a non-transient computer-readable medium in which program instructions are stored, which instructions, when read by a central processing unit (CPU), cause the CPU to:

receive data of a plurality of viewports generated from a content item during rendering of the content item;

receive data about at least one feature included in the content item;

determine, in response to comparing the data of the plurality of viewports with the data about the at least one feature included in the content item, a score representing to what extent the at least one feature is included in the plurality of viewports; and determine that a human viewed the content item based on the score when the score indicates a value above a previously determined average score representing to what extent the at least one feature is included in the plurality of viewports for a plurality of previous renderings of the content item.

18. The software product according to claim 17, wherein: the data of the plurality of viewports is position data of the plurality of viewports; and the instructions, when read by the CPU, cause the CPU to compare the position data of the plurality of viewports with respect to the content item against position data of the at least one feature included in the content item.

19. The software product according to claim 17, wherein: the data of the plurality of viewports is video data of the plurality of viewports; and the instructions, when read by the CPU, cause the CPU to search for the at least one feature in the video data of the plurality of viewports.

20. The software product according to claim 17, wherein: the content item is a video; and each one viewport of the plurality of viewports is generated from a different at least one video frame of a plurality of video frames of the video during rendering of the video, wherein the one viewport provides only a partial image from a total image of the at least one video frame.

* * * * *